United States Patent [19]  [11] 4,021,940
Saint  [45] May 10, 1977

[54] EDUCATIONAL DEVICE
[76] Inventor: David Saint, R.D. 2, Box 101, Elverson, Pa. 19520
[22] Filed: June 22, 1976
[21] Appl. No.: 698,350
[52] U.S. Cl. .................................. 35/74; 35/9 E; 35/31 A
[51] Int. Cl.² ........................................ G09B 3/00
[58] Field of Search ................ 35/9 E, 31 A, 31 C, 35/35 D, 35 F, 74

[56] References Cited
UNITED STATES PATENTS

| 1,438,144 | 12/1922 | Stevenson | 35/31 A UX |
| 1,728,584 | 9/1929 | Wright | 35/31 A UX |
| 2,797,499 | 7/1957 | Lagerdahl | 35/31 A |
| 3,523,376 | 8/1970 | Gilliam et al. | 35/31 A |
| 3,732,632 | 5/1973 | Dyer | 35/31 A |
| 3,928,922 | 12/1975 | Rosenbaum | 35/31 A X |

Primary Examiner—Harland S. Skogquist
Attorney, Agent, or Firm—Leonard C. Brenner

[57] ABSTRACT

An improved educational device comprises a hand held paddle-shaped device having a windowed front plate, a back plate, and rotatably interposed therebetween two circular disks, a first disk for displaying problem and solution indicia through the windowed front plate and a second disk for temporarily masking the display of the solution indicia. Tabs on the two disks permit both clockwise and counterclockwise rotation of the disks to a problem indicia displaying position. Subsequently, under the control of the operator of the improved educational device, the masking disk is rotated relative to the displaying disk, either manually as in one embodiment of the invention or automatically by a spring or other like means as in alternate embodiments to permit the display of both problem and solution indicia. As preferred, the display disk may be made easily interchangeable with other displaying disks having differing problem and solution indicia.

12 Claims, 12 Drawing Figures 4,021,940

EDUCATIONAL DEVICE

BACKGROUND OF THE INVENTION

In the field of pedagogical aids for teaching individuals in structured or personalized situations many types of teaching devices ranging from simple flash cards to costly and sophisticated audio-visual aids have been employed. However, such devices generally require the presence of a supervisor or operator. Devices designed for self-instruction often are either too complicated for young students or else too boring in continued use to be of significant long-term instructional benefit. Furthermore, simple hand operated devices often are designed solely for right-hand operation and also for presenting merely a single sequence of problems and solutions thereby inadvertently encouraging the student to memorize the sequence presented rather than to concentrate on and learn the solutions to the problems presented by the teaching device.

OBJECTS AND SUMMARY OF THE INVENTION

It is therefore an object of the present invention to provide a simple inexpensive educational device which may be used with or without the supervision of an instructor.

It is another object of the invention to provide an educational device which is simple to operate and also enjoyable and interesting to use.

It is yet another object of the invention to provide a simple hand-held educational device which may be used with equal ease by left and right handed individuals and which presents to the user multiple sequences of problem and solution displays.

The improved educational device of the present invention achieves the above and other objects of and purposes of the invention by providing a hand-held paddle shaped instrument having a windowed flat front plate, a flat back plate, and sandwiched therebetween two circular disks, a first disk for displaying problem and solution indicia through the windowed front plate and a second disk for temporarily masking the display of the solution indicia. Tabs on the two disks permit both clockwise and counterclockwise rotation of the disks to a problem indicia displaying position. Subsequently, under the control of the operator of the educational device, the masking disk is rotated relative to the displaying disk either manually or automatically by a spring or other like means to permit the display of both problem and solution indicia.

DESCRIPTION OF THE DRAWINGS

The above-mentioned and other objects, advantages and features of the present invention will become more readily apparent from a review of the following specification when taken together with the drawings wherein.

DETAILED DESCRIPTION OF THE INVENTION

Figure 1:
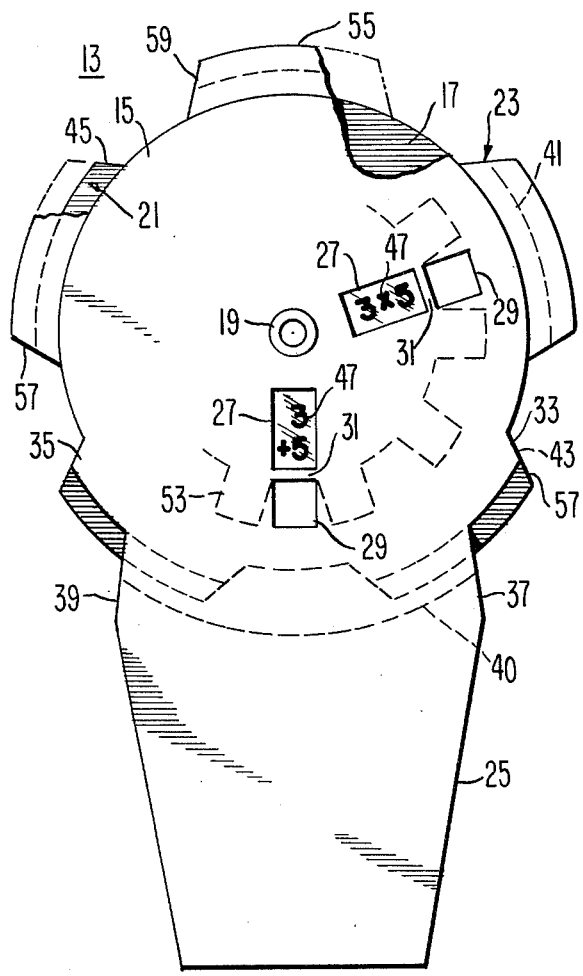
FIG. 1 is a front view of a first embodiment of the improved educational device of the present invention shown in a problem indicia displaying position.
Figure 2:
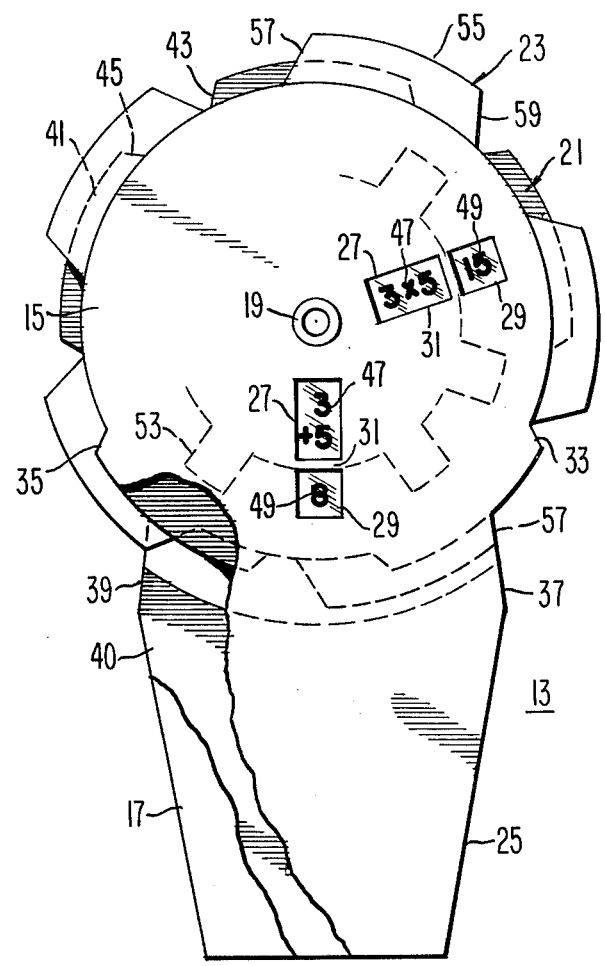
FIG. 2 is a front view of the device of FIG. 1 shown in a solution indicia displaying position.

Now referring more particularly to FIG. 1 and FIG. 2 of the drawing, a first preferred embodiment of the educational device of the present invention is shown in schematic front elevation therein. As illustrated the improved educational device 13 comprises a front plate 15, a back plate 17, and a pivot 19 extending therethrough for rotatably securing therebetween a circular display disk 21 adjacent to said back plate 17 and a circular masking shield 23 adjacent to the front plate 15. In operation, as will be detailed hereinafter, the display disk 21 and the masking disk 23 are jointly moved to a first position to display a problem and thereafter the masking disk 23 alone is moved to a second position to permit display of both the problem and the solution thereto.

The front plate 15 is formed from a light-weight material, preferably a semi-rigid plastic in the shape of a flat paddle having a handle portion 25 proportioned suitably to be hand-held. The front plate 15 is opaque except for a pair of problem display windows 27 and a pair of solution display windows 29. The windows 27 and 29 may be fashioned as either transparent panes or cut-outs in the opaque front plate 15. Further, if desired, the windows 27 and 29 may be formed as a single window by deleting a window separating bar portion 31 of the front plate 15. A first problem display position edge 33 and a second problem display position edge 35 are fashioned as a pair of positioning edges whose use to display problems will be described hereinafter. Likewise a first solution display edge 37 and a second solution display edge 39 are positioned as a pair of positioning edges for use in displaying solutions as will be described hereinafter.

The back plate 17 is formed substantially identical to the above-described front plate 15 with the deletion of the windows 27 and 29. A thin spacer 40 separates the plates 15 and 17 at the handle portion 25 thereof. The back plate 17 and the front plate 15 are centrally aligned by the pivot 19 which is secured to the back plate 17 and extends through the front plate 15. The pivot 19 may be secured to the front plate 15 as shown in FIG. 1 and FIG. 2 or it may be releasible therefrom as will be described hereinafter.

Figure 3:
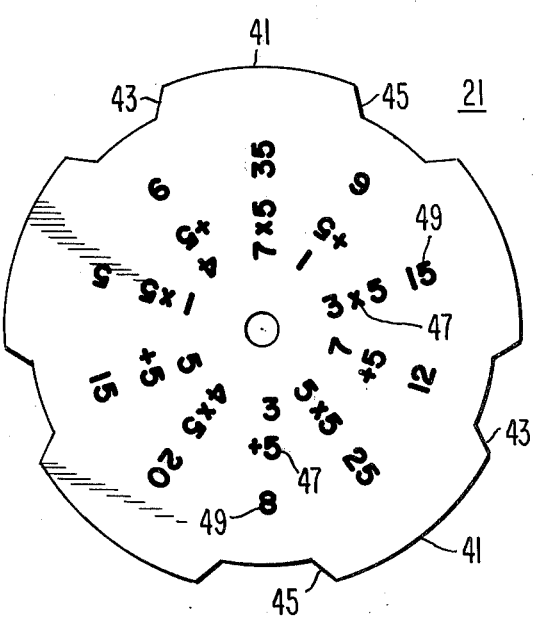
FIG. 3 is a front view of a display disk used in the device of FIG. 1.

Rotatably secured on the pivot 19 is the display disk 21, see FIG. 3. The display disk 21 is generally circular in form having a number, preferably five, of protrusions hereinafter called tabs 41. Each tab 41 has a clockwise motion edge 43 and a counterclockwise motion edge 45. The display disk 21 also includes visible problem indicia 47 and solution indicia 49. As shown in FIG. 3, the problem indicia 47 may depict an arithmetic problem and the solution indicia 49 the solution to that problem. As desired, other problems and solutions, alphanumeric or otherwise, may be depicted by the indicia 47 and 49. In operation, the problem and solution indicia 47 and 49 are located on a display disk 21 so that they both are visible through windows 27 and 29 (unless the solution indicia 49 is masked as will be explained below) when either any clockwise motion edge 43 is aligned with the first problem display edge 33 (see FIG. 2) or any counterclockwise edge 45 is aligned with the second problem display edge 35.

Figure 4:
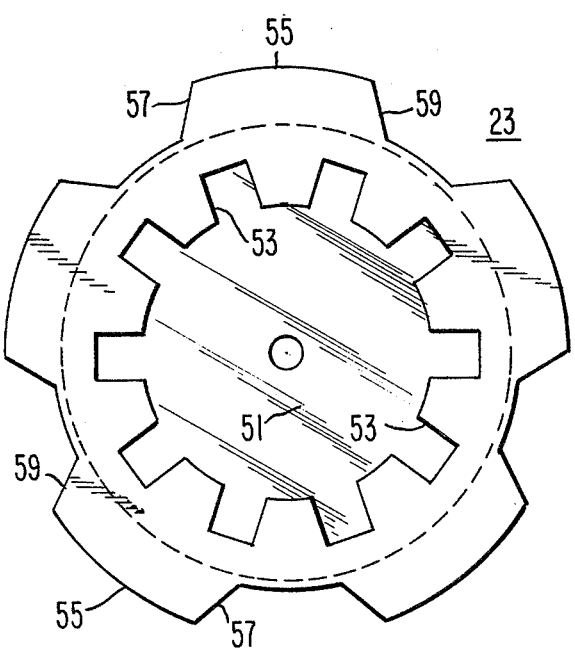
FIG. 4 is a front view of a masking disk used in the device of FIG. 1.

Also rotatably secured on the pivot 19 between the display disk 21 and the front plate 15 is the masking disk 23, see FIG. 4. The masking disk 23 is a thin opaque circular shielf having a transparent problem display area 51 and transparent solution display area 53. In a manner similar to that described for the display disk 21, the masking disk 23 also includes a number of tabs 55, each tab 55 therein having a clockwise motion edge 57 and a counterclockwise motion edge 59. As shown (FIG. 1 and FIG. 2), with the disks 21 and 23 mounted concentrically, the masking disk tabs 55 protrude beyond the display disk tabs 41.

In operation, with both the display disk and masking disk clockwise motion edges 41 and 57 aligned with the first problem display edge 33 of the front plate 15, only the problem indicia 17 is visible through the transparent problem display are 51 of the masking disk 23 and the pair of problem display windows 27 of the front plate 15, see FIG. 1. With the display disk 21 aligned as described and the masking disk clockwise motion edge 57 aligned with the first solution display edge 33 of the front plate 15, the problem indicia 47 remains visible and the solution indicia 49 becomes visible through the transparent solution display are 53 of the masking disk 23 and the solution display windows 29 of the front plate 15, see FIG. 2. Likewise, with both counterclockwise edges 45 and 59 aligned with the second problem display edge 35 only the problem indicia 47 is visible while with the display edge 45 aligned with the front plate edge 35 and the masking disk edge 59 aligned with the front plate edge 39, the problem indicia 47 remains visible and the solution indicia 49 becomes visible through the transparent solution display area 53 of the masking disk 23 and the solution display windows 29 of the front plate 15.

Since the improved educational device 13 of the present invention may be operated either clockwise or counterclockwise, it has an ambidextrous quality in that it may be used by left and right handers with equal ease. Further, the sequence of problems displayed varies for clockwise and counterclockwise operation. Also, the sequence of problems displayed varies with the degree of rotation of the display disk 21 employed during each problem operation. By varying the sequence of problems, the student is effectively discouraged from memorizing a fixed sequence of problems and encouraged rather to learn the solutions to each individually displayed problem.

In the embodiment above-described both the masking disk tab 55 and the display disk tab 41 are manually moved (i.e., with an index finger) to the problem display edge 33 (or 35) and then the masking disk tab 55 is manually moved to the solution display edge 37 (or 39). In the two embodimments to be described below the required movement of the masking disk 23 to transfer from problem indicia 47 display to solution indicia 49 display occurs automatically. Otherwise, except for a few minor modifications which will be detailed, the construction and operation of the improved educational device 13 in its automatic embodiments remains substantially identical to that of its above-described manual embodiment.

Figure 5:
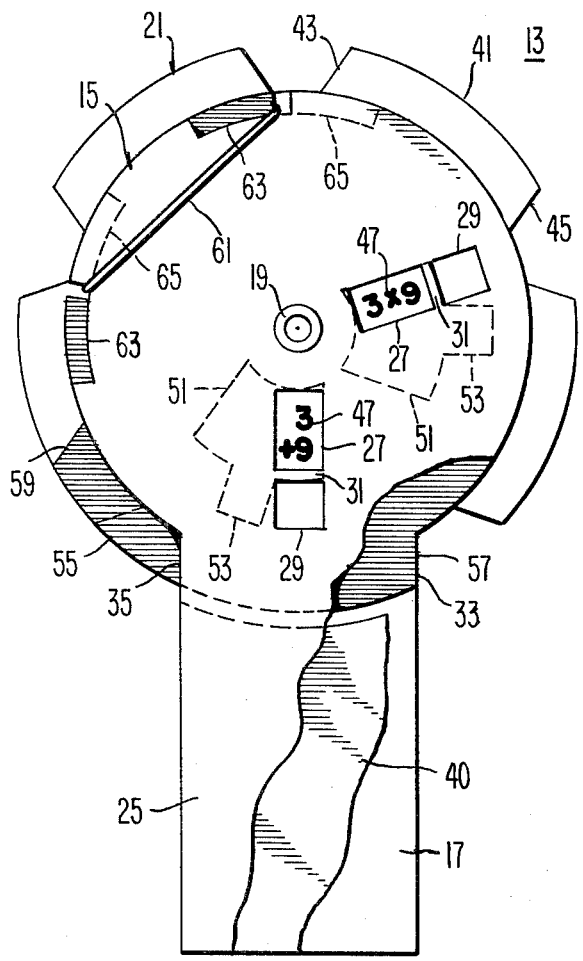
FIG. 5 is a front view of an alternate automated embodiment of the improved educational device of the present invention shown in a problem indicia displaying position.

Referring now to FIG. 5, a first embodiment of the automatic mode improved educational device 13 of the present invention has its display disk 21 and its masking disk 23 manually rotatable counterclockwise or clockwise into a problem indicia 47 displaying position (shown clockwise rotated). In such a displaying position, a rubber band 61 or the like encompassing the front plate 15 and the masking disk 23 through two notch pairs 63 and 65 located therein is stretched under moderate tension. Upon manual release of the display and masking disks 21 and 23, the tension of the rubber band 61 causes the masking disk 23 to move automatically to its solution indicia 49 displaying position, see FIG. 6.

Figure 7:
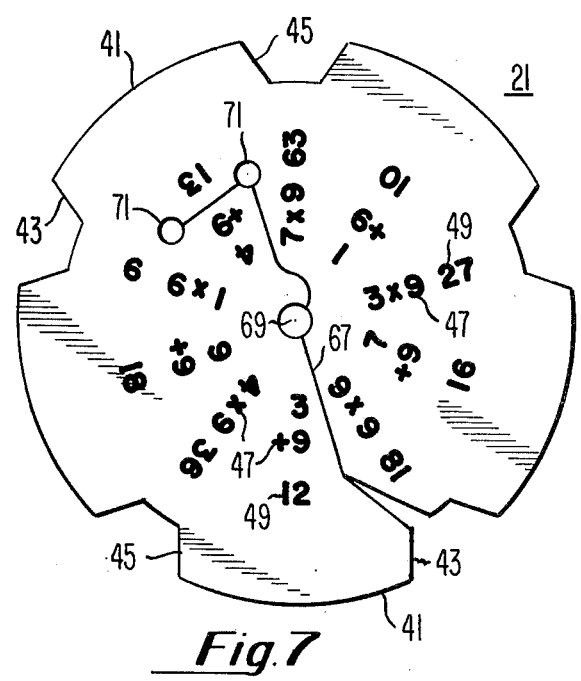
FIG. 7 is a front view of a display disk having a slit for use in the device of FIG. 5.

The automatic mode display risk 21, see FIG. 7, is constructed fundamentally as above-described for manual mode operation. The display disk 21 may include a slit 67 extending through the pivot hole 69 thereof to permit the disk 21 to be slipped onto and off of the pivot 19 to facilitate the changing of disks 21 having differing problems and solution indicia 47 and 49. Further, as shown, the slit 67 may extend through apertures 71 placed to minimize disk flexing when the disk 21 is moved onto or off of pivot 19.

Figure 6:
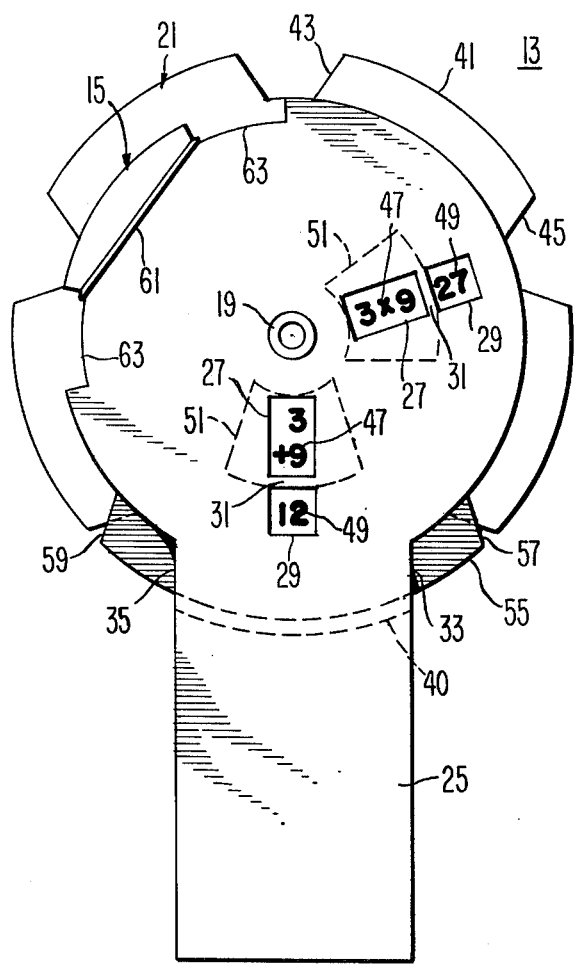
FIG. 6 is a front view of the device of FIG. 5 shown in a solution indicia displaying position.
Figure 8:
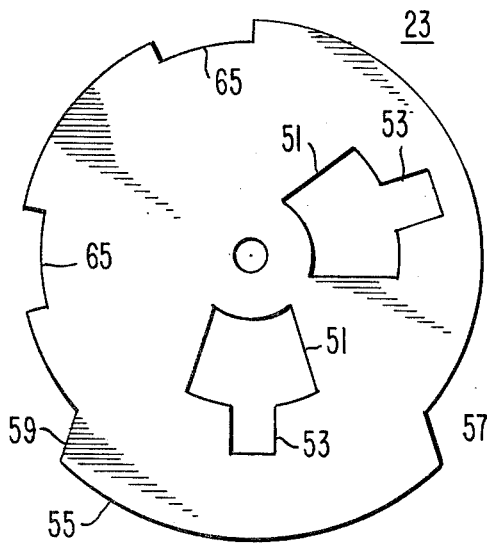
FIG. 8 is a front view of a masking disk used in the device of FIG. 5.

The automatic mode masking disk 23, see FIG. 8, requires only a single tab 55 since the action of the rubber band 61 functions to return the disk 23 to a home or solution indicia 49 position, see FIG. 6. Further, with continued reference to FIG. 8, the transparent problem and solution display areas 51 and 53 of disk 23 need only be locally defined on disk 23 to align with the problem and solution display windows 27 and 29 of the front plate 15 (see FIG. 5 and FIG. 6). The transparent problem and solution display areas 51 and 53 may be either formed as actual cut-outs or as transparent inserts or portions.

Figure 9:
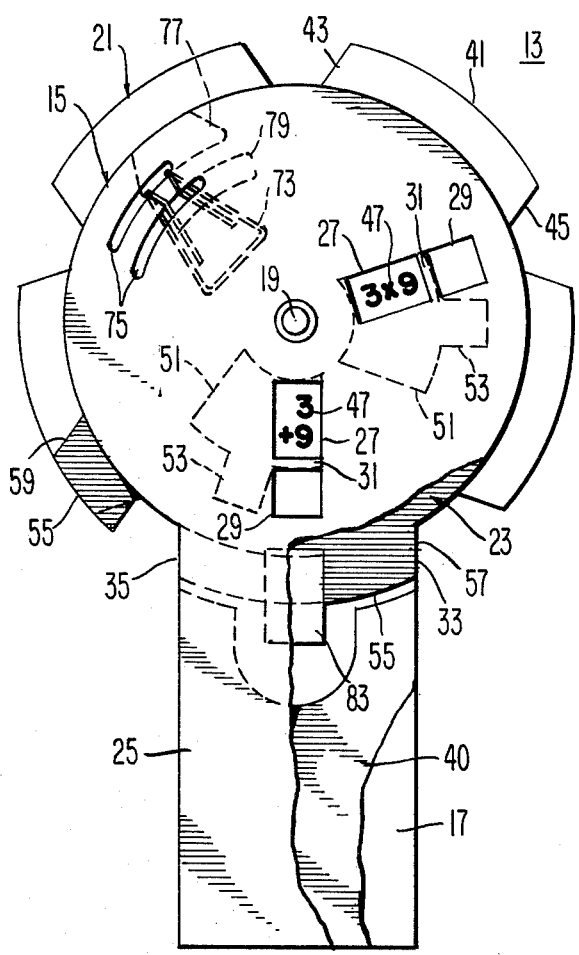
FIG. 9 is a front view of a second alternate automated embodiment of the improved educational device of the present invention shown in a problem indicia displaying position.
Figure 10:
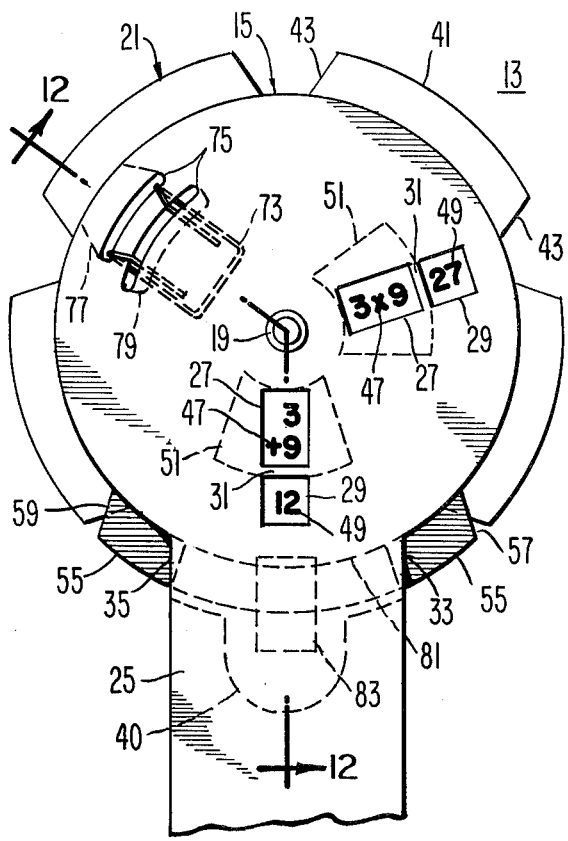
FIG. 10 is a front view of the device of FIG. 9 shown in a solution indicia displaying position.

In a second embodiment of the automatic mode improved educational device 13 of the present invention, see FIG. 9 and FIG. 10, the disk 21 and masking disk 23 is likewise manually rotatable in both the clockwise and counterclockwise directions into a problem indicia 47 displaying position (shown clockwise rotated in FIG. 9). In such a displaying position, a spring member 73 passing through a cut-out 77 and a slit 79 in masking disk 23 is manually held under moderate compression. Upon manual release of the display and masking disks 21 and 23, the release of compression on the spring member 73 causes the masking disk 23 to move automatically to its solution indicia 49 displaying position, see FIG. 10.

Figure 11:
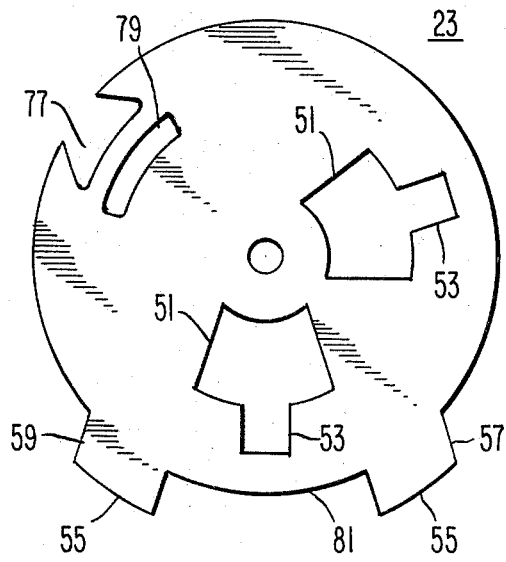
FIG. 11 is a front view of a masking disk used in the device of FIG. 9.

In the second embodiment for automatic mode operation, the display disk 21 is constructed fundamentally as above-described for manual mode operation, see FIG. 3. The masking disk 23, see FIG. 11, is similar to the masking disk 23 for use in the first embodiment of automatic mode operation (FIG. 8) with the inclusion of the above-described cut-out 77 and slit 79 for spring member 73. Further, the tab 55 is bisectioned by cut-out 81 which allows the disk 23 to rotate freely clearing a thin separating member 83 which is secured to the back plate 17 to separate the back plate 17 from the front plate 15 to provide for increased ease of movement of the display and masking disks 21 and 23.

Figure 12:
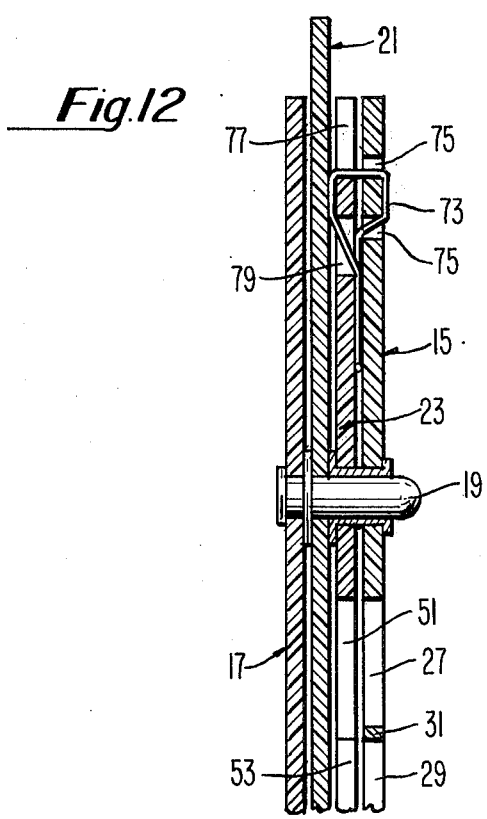
FIG. 12 is a sectional view of the second alternate automated embodiment taken along line 12—12 of FIG. 9.

FIG. 12 illustrates the positioning of spring member 73 and details a particular arrangement for pivot member 19. The pivot member 19 is secured to the back plate 17 and passes through the display disk 21, the masking disk 23 and the front plate 15. With continued reference to FIG. 12, eyelet bushing 85 secured through the front plate 15 and the masking disk 23 allows the front plate 15 and the masking disk 23 to be manually moved away from the back plate 17 and off the pivot member 19 to permit interchangeability of display disks 21 over the pivot member 19. In such a disk interchangeability arrangement, the display disk 21 need not be slitted as shown in FIG. 7 but rather may be solid with a single pivot hole 69 as shown in FIG. 3.

While only three specific embodiments of the improved educational device 13 provided by the invention have been detailed, it will be recognized that other alternate embodiments thereof likewise fall within the scope of the invention. As illustrative but by no means limiting examples, the split display disk 21 as detailed in FIG. 8 or the particular pivot member 19 shown in FIG. 9 may be used in any of the three embodiments of the invention detailed above or in similar alternate embodiments. Thus, while the invention has been particularly shown and described with reference to preferred embodiments thereof, it will be understood by those skilled in the art that various changes in form and details may be made therein.

What is claimed is:

1. An educational device having a clockwise and a counterclockwise problem indicia viewing position, said device comprising:
    a windowed front plate fashioned to be held by hand;
    a solid rear plate fashioned in form substantially identical to said windowed front plate;
    pivotal means secured to said back plate and extending through said front plate;
    a display disk rotatably mounted between said back plate and said front plate on said pivot means, said display disk having a plurality of pairs of problem indicia and solution indicia, at least one problem indicium thereof being visible through said windowed front plate in both said clockwise and said counterclockwise indicia viewing position; and
    masking means rotatable about said pivot means, interposing said display disk and said front plate for masking said solution indicia when both said masking means and said display disk are rotated into a selected problem indicia viewing position chosen from said clockwise and counterclockwise viewing positions, and, when said masking means alone is rotated from said selected problem indicia viewing position to a solution indicia viewing position, for permitting visible display through said windowed front plate of the solution indicia paired with all the problem indicia in said at least one problem indicium visible through said front plate.

2. The educational device of claim 1 wherein:
    said front plate and said back plate are each fashioned like a paddle having a circular portion and a handle portion, and
    said pivot means is secured to the center of said circular portion of said back plate and extends through the center of said circular portion of said front plate.

3. The educational device according to claim 1 wherein:
    said display disk has a plurality of protruding tabs, each tab thereof formed to facilitate manual rotation of said display disk to said clockwise and said counterclockwise problem indicia viewing positions.

4. The educational device of claim 3 wherein each individual tab in said plurality of protruding tabs has individually associated therewith a particular said at least one problem indicium for visible display through said windowed front plate when said individual tab is used to rotate said display disk to said selected problem indicia viewing position.

5. The educational device of claim 4 wherein:
    the number of individual tabs in said plurality of protruding tabs is five.

6. The educational device according to claim 3 wherein said display disk is releasibly mounted on said pivot means.

7. The educational device according to claim 6 wherein:
    said display disk is slitted from the circumference through the center thereof to facilitate the mounting on and releasing from said pivot means.

8. The educational device according to claim 6 wherein:
    said masking means is rotatably secured to said front plate and wherein said masking means and said front plate are removable from said pivot means.

9. The educational device according to claim 3 also including:
    means engaging said front plate and said masking means for automatically rotating said masking means from said selected problem indicia viewing position to said solution indicia viewing position.

10. The educational device according to claim 9 wherein:
    said means for automatically rotating includes a resilient member placed under compression when said masking means is in said selected problem indicia viewing position.

11. The educational device according to claim 10 wherein said resilient member is a spring.

12. The educational device according to claim 9 wherein:
    said means for automatically rotating includes resilient means placed under tension when said masking means is in said selected problem indicia viewing position.

* * * * *